Patented Feb. 13, 1934

1,946,960

UNITED STATES PATENT OFFICE 1,946,960

ACCELERATOR FOR RUBBER VULCANIZATION PROCESSES

Oswald Behrend, Woodhaven, N. Y., assignor to The Rubber Service Laboratories Company, Akron, Ohio, a corporation of Ohio No Drawing. Application September 2, 1931
Serial No. 560,879

10 Claims. (Cl. 18—53)

The present invention relates to the vulcanization of rubber by a new and improved process wherein a new type of rubber vulcanization accelerator is employed. The manufacture and means of employing the preferred new class of rubber vulcanization accelerators is fully set forth hereinafter and will be readily understood from the following description and examples of a preferred mode of carrying out the invention.

The preferred new class of accelerators comprises a reaction product of a mercapto-arylthiazole and benzotrichloride. The preferred materials may be incorporated alone in a rubber mix as a rubber vulcanization accelerator, but preferably are employed in conjunction with a basic organic nitrogen-containing accelerating compound as a mixed accelerator. More specifically, however, the preferred compounds are employed in conjunction with a basic organic nitrogen-containing accelerating compound, for example, diphenylguanidine, as a mixed accelerator.

The following is one example of a preferred method of manufacturing one of the new type of accelerating compounds. Substantially three molecular proportions of mercapto-benzo-thiazole and substantially three molecular proportions of sodium hydroxide were mixed together in a suitable solvent, for example, approximately 85% ethyl alcohol, and substantially one molecular proportion of benzotrichloride was added slowly thereto while maintaining the solution at approximately 70 to 78° C. The product obtained was washed preferably with a solution of sodium carbonate to remove any unreacted mercapto-benzo-thiazole and then further washed with water. The final product was a brown powder.

A portion of the material prepared as described above was incorporated in the usual manner in a pure gum rubber stock comprising 100 parts of pale crepe rubber,
5 parts of zinc oxide,
3 parts of sulfur,
1 part of the reaction product of mercapto-benzo-thiazole and benzotrichloride.

The rubber stock thus compounded was then cured in the usual manner by heating in a press for different periods of time at the temperature given by 40 pounds of steam pressure per square inch. The vulcanized rubber product on testing was found to possess the following tensile and modulus characteristics:

Table I

| Cure | | Modulus of elasticity in lbs/in$^2$ at elongations of— | | | Tensile at break in lbs/in$^2$ | Ultimate elongation |
|---|---|---|---|---|---|---|
| Time | Steam pressure | 300% | 500% | 700% | | |
| Mins. | Pounds | | | | | Percent |
| 20 | 40 | 89 | 137 | 287 | 1568 | 1040 |
| 30 | 40 | 94 | 179 | 492 | 1890 | 980 |
| 45 | 40 | 128 | 228 | 244 | 1840 | 900 |
| 60 | 40 | 148 | 240 | 669 | 2228 | 920 |
| 90 | 40 | 135 | 243 | 681 | 2245 | 910 |

The above data show that the preferred class of materials, for example, the reaction product of mercapto-benzo-thiazole and benzo trichloride, possesses accelerating characteristics. These properties, however, are materially increased when the material is employed in conjunction with a basic organic nitrogen-containing accelerating compound, for example, diphenylguanidine, as a mixed accelerator. Thus, a portion of this material was incorporated in a rubber stock comprising 100 parts of pale crepe rubber,
5 parts of zinc oxide,
3 parts of sulfur,
0.6 part of diphenylguanidine,
0.4 part of the reaction product of mercapto-benzo-thiazole and benzotrichloride.

The rubber mix was then vulcanized by heating in a press for the same times and pressures as in the tests set forth in Table I. The physical characteristics of the rubber stock, after curing, are given in Table II.

Table II

| Cure | | Modulus of elasticity in lbs/in$^2$ at elongations of— | | | Tensile in lbs/in$^2$ at break | Ultimate elongation |
|---|---|---|---|---|---|---|
| Time | Steam pressure | 300% | 500% | 700% | | |
| Mins. | Pounds | | | | | Percent |
| 10 | 40 | 119 | 235 | 905 | 2480 | 890 |
| 20 | 40 | 192 | 455 | 1980 | 3385 | 810 |
| 30 | 40 | 235 | 643 | 2728 | 4000 | 790 |
| 45 | 40 | 280 | 745 | 3020 | 4100 | 760 |
| 60 | 40 | 312 | 875 | 3625 | 4300 | 760 |

The above results show that the preferred class of vlucanization accelerators possesses greatly increased accelerating power when employed as a component of a mixed accelerator in conjunction with a basic organic nitrogen-containing accelerator, for example, diphenylguanidine.

Other methods of preparing the new accelerating compounds may be employed: Thus substantially three molecular proportions of a mercapto-aryl-thiazole, for example, mercapto-benzo-thiazole, and substantially one molecular proportion of benzo trichloride were dissolved in a suitable solvent, for example, ortho-dichlor-benzene, and the solution heated to a refluxing temperature until reaction was completed. The solution was then poured into water, neutralized, preferably with sodium carbonate and steam distilled to remove the ortho-dichlorbenzene. The residue was extracted preferably with a solution of sodium carbonate to remove any unreacted mercapto-benzo-thiazole, and then further washed with boiling water to remove traces of alkali. The final product was a pitch-like solid, which could be ground to a brown powder.

Portions of the product prepared by the last method hereinbefore described were tested for accelerating properties in a manner analogous to that described above. Thus, the material so prepared was incorporated in a rubber stock of the following composition:

100 parts of pale crepe rubber,
5 parts of zinc oxide,
3 parts of sulfur,
0.8 part of diphenylguanidine,
0.2 part of the reaction product of mercapto-benzo-thiazole and benzotrichloride.

The stock was cured in the usual manner and upon being tested for modulus and tensile properties gave the following results:

*Table III*

| Cure | | Modulus of elasticity in lbs/in² at elongations of— | | | Tensile at break in lbs/in² | Ultimate elongation |
|---|---|---|---|---|---|---|
| Time | Steam pressure | 300% | 500% | 700% | | |
| mins. | lbs. | | | | | Per cent |
| 10 | 40 | 76 | 170 | 500 | 1750 | 895 |
| 20 | 40 | 139 | 326 | 1440 | 2700 | 800 |
| 30 | 40 | 222 | 505 | 2115 | 3095 | 760 |
| 45 | 40 | 242 | 695 | 2960 | 3590 | 725 |
| 60 | 40 | 283 | 813 | 3310 | 3410 | 705 |
| 90 | 40 | 294 | 695 | 3350 | 3545 | 710 |

The preferred class of compounds have also been prepared by heating together a mercapto-aryl-thiazole and benzotrichloride in the absence of a solvent. Thus substantially three molecular proportions of mercapto-benzo-thiazole and substantially one molecular proportion of benzotrichloride were heated in the absence of a solvent at a temperature of approximately 180 to 190° C. until reaction was completed. The product so formed was also tested in a rubber stock and found to possess valuable accelerating properties.

In the above described tests of compounded rubber stocks, the preferred basic organic nitrogen-containing accelerator employed in conjunction with an accelerator of the preferred class was diphenylguanidine. Other basic organic nitrogen-containing accelerators, such, for example, as di-ortho-tolylguanidine, piperazine, 2,4-diamino-diphenylamine, para para diamino-diphenyl-methane, anhydro-formaldehyde-aniline, and the like, may be employed in conjunction with a reaction product of a mercapto-aryl-thiazole and benzotrichloride in the manner described, with resulting improvement in the curing of the stock.

Other examples of the preferred class of materials may be used as above described. Thus, mercapto-tolyl-thiazole, mercapto-xylylthiazoles, mercapto-naphtho-thiazoles, and the like, may be reacted with benzotrichloride, and the resulting compounds employed as accelerators in the rubber vulcanization process.

The present invention is limited only as defined in the following claims, in which it is intended to claim all novelty inherent in the invention as broadly as is permissible in view of the prior art.

What is claimed is:

1. The process of vulcanizing rubber which comprises heating rubber and sulfur in the presence of an accelerator comprising the reaction product of substantially three molecular proportions of mercapto-benzo-thiazole and substantially one molecular proportion of benzotrichloride.

2. The vulcanized rubber product prepared by heating rubber and sulfur in the presence of an accelerator comprising the reaction product of substantially three molecular proportions of mercapto-benzo-thiazole and substantially one molecular proportion of benzotrichloride.

3. The process of vulcanizing rubber which comprises heating rubber and sulfur in the presence of an acelerator comprising a reaction product of substantially three molecular proportions of a mercapto-aryl-thiazole and substantially one molecular proportion of benzotrichloride.

4. The process of vulcanizing rubber which comprises heating rubber and sulfur in the presence of a mixture of accelerators comprising a basic organic nitrogen containing accelerator and a reaction product of substantially three molecular proportions of a mercapto-aryl-thiazole and substantially one molecular proportion of benzotrichloride.

5. The process of vulcanizing rubber which comprises heating rubber and sulfur in the presence of a mixture of accelerators comprising a basic organic nitrogen containing accelerator and a reaction product of substantially three molecular proportions of a mercapto-benzo-thiazole and substantially one molecular proportion of benzo-trichloride.

6. The process of vulcanizing rubber which comprises heating rubber and sulfur in the presence of a mixture of accelerators comprising diphenyl guanidine and a reaction product of substantially three molecular proportions of mercaptobenzothiazole and substantially one molecular proportion of benzotrichloride.

7. The vulcanized rubber product prepared by heating rubber and sulfur in the presence of an accelerator comprising a reaction product of substantially three molecular proportions of a mercapto-aryl-thiazole and substantially one molecular proportion of benzo-trichloride.

8. The vulcanized rubber product prepared by heating rubber and sulfur in the presence of a mixture of accelerators comprising a basic organic nitrogen containing accelerator and a reaction product of substantially three molecular proportions of a mercapto-aryl-thiazole and substantially one molecular proportion of benzo-trichloride.

9. The vulcanized rubber product prepared by heating rubber and sulfur in the presence of a mixture of accelerators comprising a basic organic nitrogen containing accelerator and a reaction product of substantially three molecular proportions of a mercapto-benzo-thiazole and substantially one molecular proportion of benzo-tri-chloride.

10. The vulcanized rubber product prepared by heating rubber and sulfur in the presence of a mixture of accelerators comprising diphenyl guanidine and a reaction product of substantially three molecular proportions of mercaptobenzothiazole and substantially one molecular proportion of benzo-tri-chloride.

OSWALD BEHREND.